US010860300B2

(12) United States Patent
Tsirkin

(10) Patent No.: US 10,860,300 B2
(45) Date of Patent: Dec. 8, 2020

(54) DIRECT FUNCTION CALL SUBSTITUTION USING PREPROCESSOR

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/115,357

(22) Filed: Aug. 28, 2018

(65) Prior Publication Data

US 2020/0073643 A1 Mar. 5, 2020

(51) Int. Cl.
*G06F 9/44* (2018.01)
*G06F 8/41* (2018.01)
*G06F 9/445* (2018.01)

(52) U.S. Cl.
CPC .............. *G06F 8/423* (2013.01); *G06F 8/425* (2013.01); *G06F 9/44505* (2013.01)

(58) Field of Classification Search
None
See application file for complete search history.

(56) References Cited

U.S. PATENT DOCUMENTS

| 5,754,858 A * | 5/1998 | Broman ................... G06F 8/30 717/111 |
| 7,886,148 B2 | 2/2011 | Kiriansky et al. |
| 9,436,847 B2 | 9/2016 | Durham et al. |
| 9,542,162 B2 | 1/2017 | Gazzillo et al. |
| 2007/0103175 A1* | 5/2007 | Eigler ................. G06F 11/3466 717/158 |
| 2016/0285896 A1 | 9/2016 | Caprioli |

OTHER PUBLICATIONS

CentOS, "CentOS 7—Updates for x86_64: development/languages: cpp," retrieved May 4, 2018 from http://flp.riken.ip/Linux/cern/centos/7/updates/x86_64/repoview/cpp.html, 1 page.
Gleixner, Thomas, "x86/pti updates for 4.15," retrieved from https://lkml.org/lkml/2018/1/14/88, Jan. 14, 2018, 26 pages.
Hacker News, "LLVM patch to fix half of Spectre attack," retrieved May 4, 2018 from https://news.ycombinator.com/item?id=16070050, 28 pages.
Tenable, Inc., "openSUSE Security Update : kernelfirmware (openSUSE—Sep. 2018) (Spectre)," retrieved May 4, 2018 from https://www.tenable.com/plugins/nessus/105642, 2 pages.

* cited by examiner

*Primary Examiner* — Qamrun Nahar
(74) *Attorney, Agent, or Firm* — Lowenstein Sandler LLP

(57) ABSTRACT

Systems and methods for generating a macro substitution command to substitute a single function for a given symbolic name are described. An example method may include a processor analyzing a plurality of build configuration files that describe parameters for building a plurality of source code files. The processor determines whether a single function is declared in the plurality of build configuration files for a given symbolic name. The processor, upon determining that a single function is declared, generates a macro substitution command to substitute an identifier of the single function for the given symbolic name.

20 Claims, 3 Drawing Sheets

DIRECT FUNCTION CALL SUBSTITUTION USING PREPROCESSOR

TECHNICAL FIELD

This disclosure relates to computer systems, and more particularly, to analyzing and updating function calls in source code files.

BACKGROUND

Programs may be written in a high level programming language. Program text in the high level language may be referred to as source code. Build systems may compile source code to generate executable program code. A build system may include multiple stages for compiling source code to generate the executable program code. A preprocessor component may translate the source code to generate updated source code that ready for compilation. A compiler may input the updated source code and generate the executable program code that may be executed by a computer.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
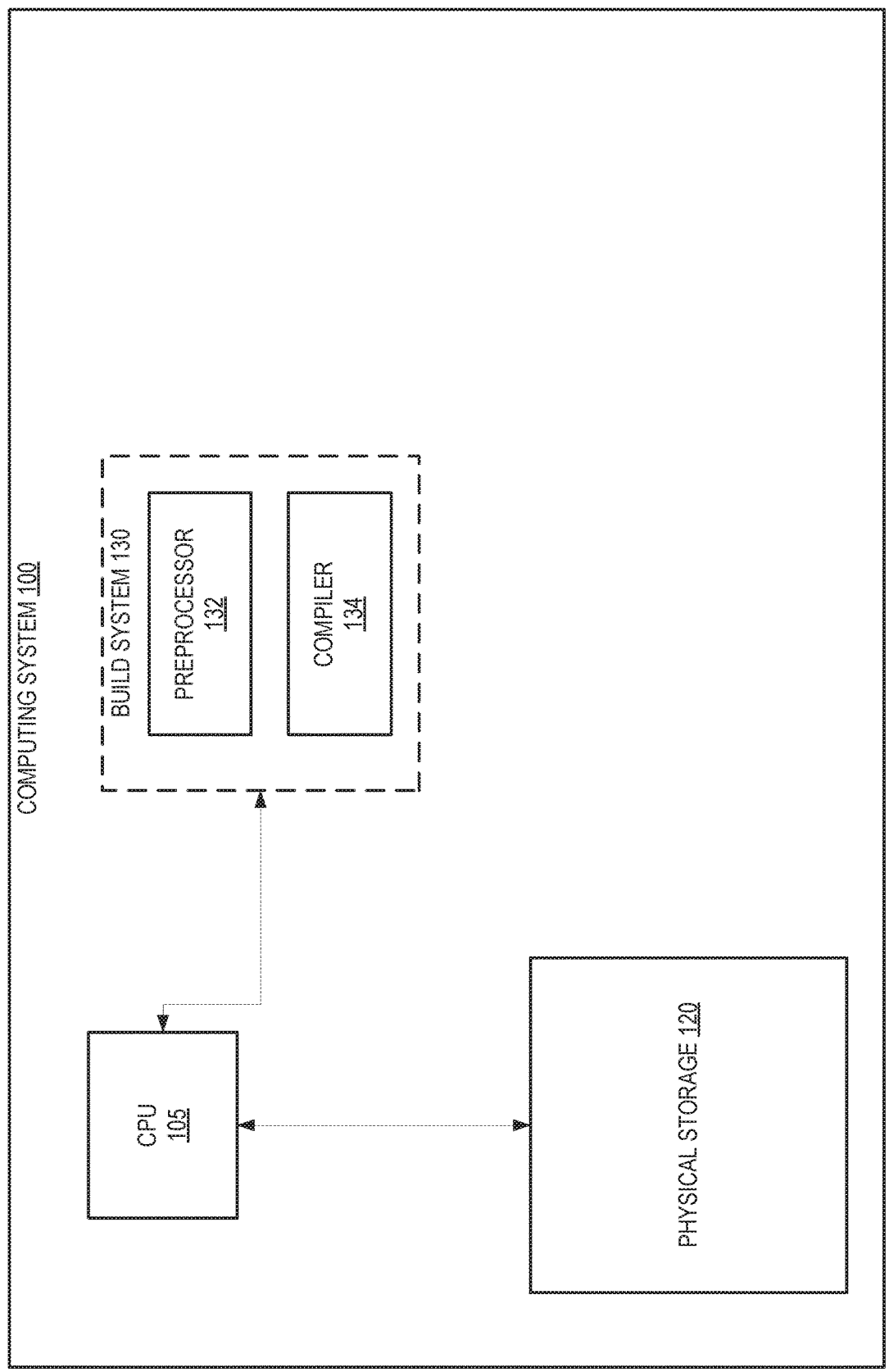
FIG. 1 depicts a high-level component diagram of an illustrated example of a computing system, in accordance with one or more aspects of the present disclosure.

Described herein are systems and methods for identifying a symbolic name representing a single function from build configuration files and generating a macro substitution command to substitute the symbolic name with an identifier for the single function within source code files, for the purposes of building executable instructions that contain direct function calls to the single function.

In an illustrative example, a computing system may include build programs, such as Make, Ant, Maven and others, that are employed to build executable programs and libraries from source code files. For example, a build program may compile source code by transforming the source code into platform-specific instructions, such as machine code, that may be stored and then executed by a central processing unit (CPU). The compilation process may include stages of pre-processing, compilation, assembly, and linking.

Preprocessing source code may include analyzing build configuration files and source code files for build instructions to prepare source code files for compilation. Build instructions may include parameters that specify macro substitutions (e.g., definitions of symbolic names). The preprocessing stage may include other operations, such as expansion of include files. The preprocessed source code may then be compiled into executable instructions.

An executable instruction may specify an operation to be performed and operands that define input and output locations for data to be processed. Once the executable code is generated, the executable code may be executed by the CPU.

In an example, CPU architecture may improve processing time for executing executable code by employing pipeline execution techniques. Pipeline execution refers to a technique for implementing instruction-level parallelism within a single processor of the CPU. Pipelining refers to assigning tasks to parts of the processor by dividing incoming instructions into a series of sequential steps that are each performed by different components of the processor, such that different parts of different instructions are performed in parallel. An instruction cycle for a single instruction may include the steps of fetch, decode, execute, and write back. For instance, a processor executing an instruction may first fetch from a memory address the instruction to be executed. Second, decode the encoded instruction. Third, execute the decoded instruction. Fourth, write back the output of the executed instruction to a CPU register. Typically, a processor may perform each of the described steps for an instruction cycle before proceeding to the next instruction. In pipeline execution, steps of instruction cycles for multiple instructions may be executed concurrently. For example, the processor may have different components assigned to perform the steps of fetching, decoding, executing, and writing-back of multiple instructions. At each clock cycle different components of the processor may perform actions on different instructions in parallel. For instance, a first component of the processor may perform a write back for a first instruction, a second component of the processor may execute a second instruction, a third component of the processor may perform a decode on a third instruction, and a fourth component of the processor may perform a fetch on a fourth instruction.

However, an instruction that includes a conditional branch may cause a processor to stall because the instruction may depend on the outcome of another instruction that has not yet been completed. A conditional branch is an instruction that directs the processor to another part of the program based upon result of a comparison, such as an IF THEN ELSE expression. If the comparison expression compares values from another instruction that has yet to be completed, then the component of the processor processing the conditional branch instruction may remain idle until the first instruction has been completed.

In other examples, the flow of pipeline execution may be delayed by indirect function calls. An instruction that includes a direct function call specifies a memory address of the function such that the processor may jump to the address of the function and proceed with executing the function within the pipeline. An instruction with an indirect function call however, is an instruction that specifies a pointer to executable code within memory. During execution of the instruction the processor first de-references the pointer to determine the location of the intended function and then jumps to the location in memory for the intended function. De-referencing function pointers occurs at runtime and may cause delays, such as extra clock cycles for dereferencing.

Modern CPU architectures may implement speculative execution techniques in order to reduce delays caused by instructions that include conditional branches and/or indirect function calls. Speculative execution employs branch predictions to predict the outcome of a conditional branch and proceed along the predicted path until the actual result is known. If the prediction is true, the predicted execution is allowed to commit. However, if the prediction is incorrect, then execution of the predicted path is rolled back and re-executed along the other path. Speculative execution may be implemented for indirect function calls where the address of the function is predicted by the processor. Speculative execution when implemented with pipeline execution may reduce delays caused by conditional branches by predicting the outcome of the conditional branch rather than waiting for the outcome to be determined by waiting for other instructions to complete.

However, recent security vulnerabilities associated with speculative execution have been exposed, whereby performing speculative execution may expose privileged access to memory. As a result, many CPU architectures have disabled implementation of speculative execution. By disabling speculative execution, performance gains for conditional branches and indirect function calls are no longer available.

Aspects of the present disclosure seek to improve performance of pipeline execution by transforming source code instructions, which would otherwise result in indirect function calls, into direct function calls when possible. When building executable code, a compiler may, during the pre-processing phase, analyze a plurality of build configuration files that describe parameters for building a plurality of source code files. A build configuration file may include a collection of project settings for compiling, debugging, and/or optimizing the generation of executable program code for the target system. For example, the build configuration files may include a set of key-value pairs that describe compilation parameters for the machine performing the build. For example, when building a kernel for a virtual machine (VM), the plurality of build configuration files and the plurality of source code files may be associated with a variety of modules, including VM network drivers. The network drivers may be used to communicate with physical network devices located on the host machine, such as a hypervisor.

Source code files for a kernel of the VM may include generic code that is compatible with a variety of different types of physical network cards. The generic code allows for wide compatibility with many different physical devices but, when compiled will result in an indirect function call that is compatible with different physical devices on the hypervisor. As noted herein above, executable code that contains indirect function calls may result in performance penalties. However, in some situations the host on which a VM will be executed may only have a single type of network devices, thereby not needing the wide compatibility provided by the generic code with indirect function calls.

Aspects of the present disclosure improve performance of pipeline execution by identifying situations where only a single function call for a given symbolic name is referenced in the plurality of build configuration files. In an implementation, a build system may analyze a plurality of build configuration files that describe parameters for building a plurality of source code files. The build configuration files may support symbol name declarations. For example, Linux build description files for a driver may be extended to support symbol name declarations that assign a particular function to a given symbol name.

The build system may determine whether a single function is declared in the plurality of build configuration files for the given symbolic name. For example, the build configuration files may include a declaration such as, DECLARE(netdev_xmit, virtio_xmit), where the given symbol is netdev_xmit and the function name is virtio_xmit, which represents a function call for a network device. If the hypervisor stores code for a single function then the build system would determine that there is only one instance of the virtio_xmit function call. If however, there are two or more functions referencing the given symbolic name then the build system would determine that there are multiple instances for the virtio_xmit function.

In an implementation, the source code files that typically include indirect function calls may be modified to include function calls using the given symbol in the place of indirect function calls. For example, source code files may include direct and indirect function calls. The source code files may be modified to replace the indirect function calls with references to the given symbol with input parameters for the indirect function call. For example, a source code file may include "netdev(dev, packet)," where netdev is the given symbol and (dev, packet) are the input parameters for the device driver function call.

Upon determining that the given symbol refers to a single function call, the build system may modify the source code files so that during compilation a direct function call for the single function is generated in place of an indirect function call to the single function. In an implementation, the build system may generate a macro substitution command to substitute an identifier of the single function for the given symbolic name. For example, the build system may generate a macro command that substitutes, during the pre-processing stage, the identifier of the single function for the given symbol within the source code files. Then during the compilation stage, the build system may interpret the substituted identifier as a direct function call to the function of the networking device. The build system may generate an executable instruction that is a direct function call, thus ensuring the performance advantages of pipeline execution without delays associated with indirect function calls.

In an implementation, the build system may implement the macro substitution command by inserting the declaration for the macro into the compiler execution command. For example, the compiler execution command may be modified to include a command line option of "-Dnetdev_xmit=virtio_xmit", where -D is used to declare a new macro and the macro specifies the symbol name of netdev_xmit as implementing the function call of virtio_xmit. In another implementation, the build system may implement the macro substitution command by inserting the macro declaration into a build configuration file, such that during pre-processing the build system will generate the macro if there is only one instance of the virtio_xmit function specified.

In an implementation, after generating the macro substitution command, the build system may perform preprocessing steps such as inserting function definitions from included files, and executing defined macros. For example, execution of defined macros includes substituting the identifier of the function, virtio_xmit, for the symbol name, netdev_xmit, in the source code files to generate updated source code files. After the pre-processing stage, the build system may compile the updated source code files to generate a set of executable instructions. Included in the set of executable instructions may be instructions for the function call that include address in memory for the specific virtio_xmit function.

If, however, the hypervisor contains code for two or more functions then during preprocessing analysis of the build configuration files the build system may determine that there are multiple instances of the network function, virtio_xmit, and may not generate a macro substitution command for a single function. In an implementation, when preprocessing the source code files, and the preprocessor may execute a preprocessor code block that replaces the given symbol name in the source code file with an indirect function call if the given symbol has not been already implemented as a macro command. For example, a source code file may contain a preprocessing code that contains the following conditional statement:

ifndef netdev_xmit
define netdev_xmit(d, p) d->xmit(d,p)
endif where "#ifndef netdev_xmit" is a conditional statement indicating that the preprocessor should execute the block of code if the macro "netdev_xmit" has not been defined. As described, the macro substitution command will not be generated if there are multiple instances of the function. The block of code "define netdev_xmit(d, p) d->xmit(d,p)" defines a substitution command to substitute instances of the given symbol and its parameters "netdev_xmit(d, p)" with the indirect function call "d->xmit(d,p)".

Implementations described herein refer to instances of function calls for network devices drivers. Other implementations may include other device drivers, including user space drivers such as, Data Plane Development Kit (dpdk) and Storage Performance Development Kit (spdk). In yet other implementations, the single function call may be associated with device drivers for embedded systems.

FIG. 1 depicts a high-level component diagram of an illustrated example of a computing system. Other architectures for computing system 100 are possible, and implementation of a computer system utilizing examples of the present disclosure is not limited to the specific architecture depicted by FIG. 1. As shown in FIG. 1, the computing system 100 comprises CPU 110, physical storage device 120 on which build software 130 may be stored. It should be noted that although, for simplicity, a single CPU 110 and physical storage device 120 are depicted in FIG. 1, other implementations of the computer system 100 may comprise a plurality of CPUs and storage devices.

In an implementation, the CPU 110 may represent a central processing unit configured to execute processing logic for performing operations and steps discussed herein. The CPU 110 may be communicatively coupled to the physical storage device 120. The physical storage device 120 may be used to store source code files, build configuration files, and executable program code generated by the build software 130. In an implementation, the build software 130 may include software components such as preprocessor 132 and compiler 134. Preprocessor 132 may be a computer program employed to analyze source code file and configuration files for preprocessor directives. Preprocessor directives may include preprocessor commands that insert code from header files, libraries, classes, interfaces directly into source code files, define and execute macros, and remove comments from the source code files. Preprocessor 132 may translate source code files by applying preprocessor directives to source code files to generate updated source code files that are ready to be compiled. For example, preprocessor 132 may insert code from libraries into the source code files, remove comments from the source code files, and execute macros to generate source code within updated source code files that are ready to be compiled by the compiler 134.

Compiler 132 may be a computer program employed to transform high-level source code from the updated source code files into executable program instructions. For example, compiler 132 may transform source code into machine code that may be executed by the CPU 110.

Figure 2:
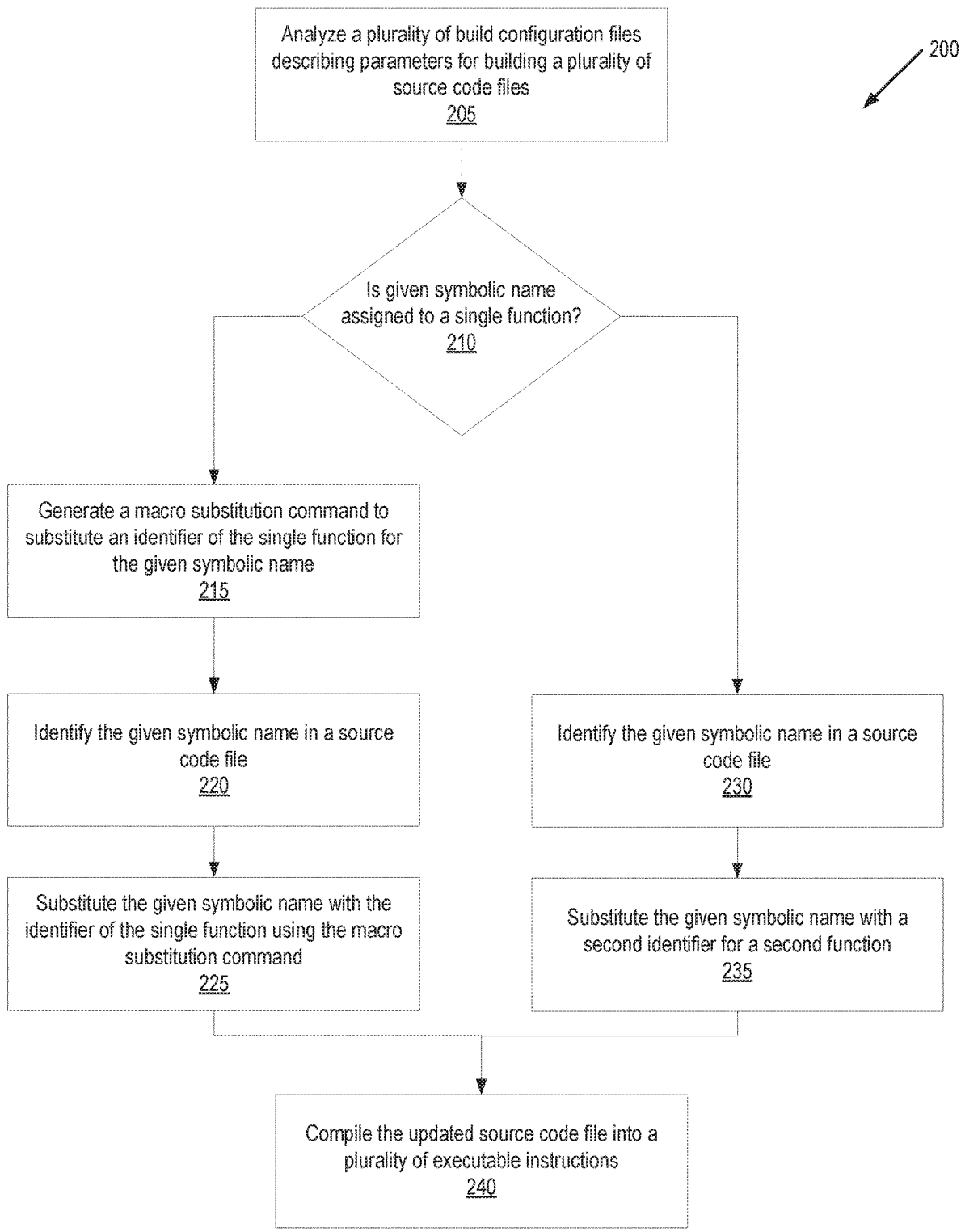
FIG. 2 depicts a flow diagram of an example method for generating a macro substitution command to substitute an identifier of a function for a given symbolic name within source code.

FIG. 2 depicts a flow diagram of an example method 200 for generating a macro substitution command to substitute an identifier of a function for a given symbolic name within source code. The method may be performed by processing logic that may comprise hardware (circuitry, dedicated logic, etc.), computer readable instructions (run on a general purpose computer system or a dedicated machine), or a combination of both. In one illustrative example, method 200 may be performed by preprocessor 132 of computing system 100. Alternatively, some or all of method 200 might be performed by other modules or machines.

In an implementation, preprocessor 132, executing on the CPU 110, may receive source code files and build configuration files representing a computer program, such as a kernel, or a portion of a computer program to be compiled. The source code files may include source code for implementing one or more drivers for physical devices, such as a network card. The source code files may include a set of several lines of source code to be compiled to generate executable program instructions. Method 200 may represent the preprocessor 132 receiving one or more build configuration files and source code files.

At block 205, processing logic analyzes a plurality of build configuration files that describe parameters for building a plurality of source code files. In an implementation, the preprocessor 132 may analyze the plurality of build configuration files to identify build parameters that are optimize for the virtual machine running the build. Included in analyzing the build configuration files is the preprocessor 132 determining whether a single function for a particular type of driver is declared. For example, the preprocessor 132 may analyze build configuration files to determine how many network drivers are to be utilized for available network devices. For instance, if the preprocessor 132 receives build configuration files for building a kernel for a VM and the host machine contains a single function reference, then the preprocessor 132 may identify a single function for a driver of the single network device. Alternatively, if the hypervisor contains multiple network devices, then the preprocessor 132 may analyze and identify multiple instances of the function for different network devices.

At decision block 210, processing logic determines whether a single function is declared for a given symbolic name. In an implementation, the preprocessor 132 determines whether a declared symbolic name that implements a function call points to a single function or to multiple functions. For example, the build configuration files may contain declarations defining the given symbolic name as implementing a specific function. For instance, the build configuration files may contain the declaration of DECLARE(netdev_xmit, virtio_xmit), where the given symbol is netdev_xmit and the function name is virtio_xmit. The preprocessor 132 may determine whether there is only one instance of the virtio_xmit function for the computing system 100. The computing system 100 may have only one instance of virtio_xmit if there is only one driver for a device that supports virtio_xmit. Alternatively, the preprocessor 132 may determine that the computing system 100 may have multiple drivers for devices that each support their own virtio_xmit function.

If at decision block 210 processing logic determines that there is a single function implemented for the symbolic name, then processing logic proceeds to block 215. At block 215, processing logic generates a macro substitution command to substitute an identifier of the single function for the given symbolic name. In an implementation, the preprocessor 132 generates a macro substitution command for substituting the given symbolic name for the single function. For example, the macro substitution command may specify that the symbolic name "netdev_xmit" shall be replaced with the direct function call "virtio_xmit."

In an implementation, the macro substitution command may be generated as a result of a command line execution parameter defining the macro substitution command. For example, the build software 130 may be executed on the command line with a build command, such as "make". The build command to compile the source code files may include a command line option specifying "-Dnetdev_xmit=virtio_xmit", where -D is used to declare a new macro and the macro specifies the symbol name of netdev_xmit as implementing the function call of virtio_xmit. In another implementation, the macro substitution command may be included within one of the build configuration files, such that during pre-processing the build system will generate the macro if there is only one instance of the virtio_xmit function.

At block 220, processing logic may identify the given symbolic name in a source code file. In an implementation, the preprocessor 132 may analyze source code files to identify source code that contains the symbol name. For example, the preprocessor 132 may analyze the source code for instances of the symbol name netdev_xmit.

At block 225, processing logic substitutes the symbolic name with the identifier of the single function using the macro substitution command. For example, the preprocessor 132 substitutes the identifier virtio_xmit, which represents the single function name, for the identified symbolic name netdev_xmit to produce an updated source code file that includes "virtio_xmit(dev, packet)". After the preprocessor 132 has made necessary substitutions to the source code files, the preprocessor 132 may send the updated source code files to the compiler 134 for compilation.

Referring back to decision block 210, if the preprocessor 132 determines that there are multiple functions implemented for the symbolic name, the preprocessor 132 may proceed to block 230. The preprocessor 132 may determine that there are multiple functions implemented for the symbolic name if there are multiple drivers enabled for multiple physical devices. As a result, the processor 132 cannot generate a macro substitution command to substitute a single function call for each given symbolic name because there are multiple functions associated with the single symbolic name. At block 230, processing logic identifies the given symbolic name in a source code file. In an implementation, the preprocessor 132 proceeds to analyze a source code file to identify instances of the given symbolic name.

At block 235, processing logic substitutes the given symbolic name with a second identifier for a second function. In an implementation, the second function may represent an indirect function call that is compatible with multiple functions associated with multiple drivers. For example, the preprocessor 132 may substitute the given symbolic name with an identifier that represents an indirect function call for transmitting packets. The indirect function call may be represented as "dev->xmit(d,p)" where dev represents a device object, xmit represents a generic transmit function call that is compatible with multiple drivers, and (d,p) are input parameters.

In an implementation, the second function may be defined within preprocessing code as part of a conditional statement evaluated by the preprocessor 132. For example, the source code file may include the following conditional statement that is evaluated by the preprocessor 132:

ifndef netdev_xmit
define netdev_xmit(d, p) d->xmit(d,p)
endif where "#ifndef netdev_xmit" is a conditional statement indicating that the preprocessor should execute the block of code if the macro "netdev_xmit" has not been defined. Upon evaluating the above preprocessing code, the preprocessor 132 may substitute instances of the symbolic name and parameters "netdev_xmit(d, p)" with the indirect function call "d->xmit(d,p)".

Referring to FIG. 2, after processing logic has preprocessed the source code files (either in block 225 or block 235), processing logic proceeds to block 240. At block 240, processing logic compiles the updated source code files to generate a plurality of executable instructions. In an implementation, the compiler 134 compiles the updated source code files to generate a plurality of executable instructions. If the preprocessor 132 substituted instances of the given symbolic name for the identifier of the single function, then the compiler 134 would generate executable program instructions that include direct function calls. The direct function calls, which when executed result in efficient pipeline execution without delays due to an extra read from memory associated with indirect function calls.

If however, the preprocessor 132 substituted instances of the given symbolic name for the second identifier of an indirect function, then the compiler 134 would generate executable program instructions that include indirect function calls. This represents a fallback scenario for when the computing system 100 has multiple drivers and multiple function call definitions implementing the given symbolic name.

Figure 3:
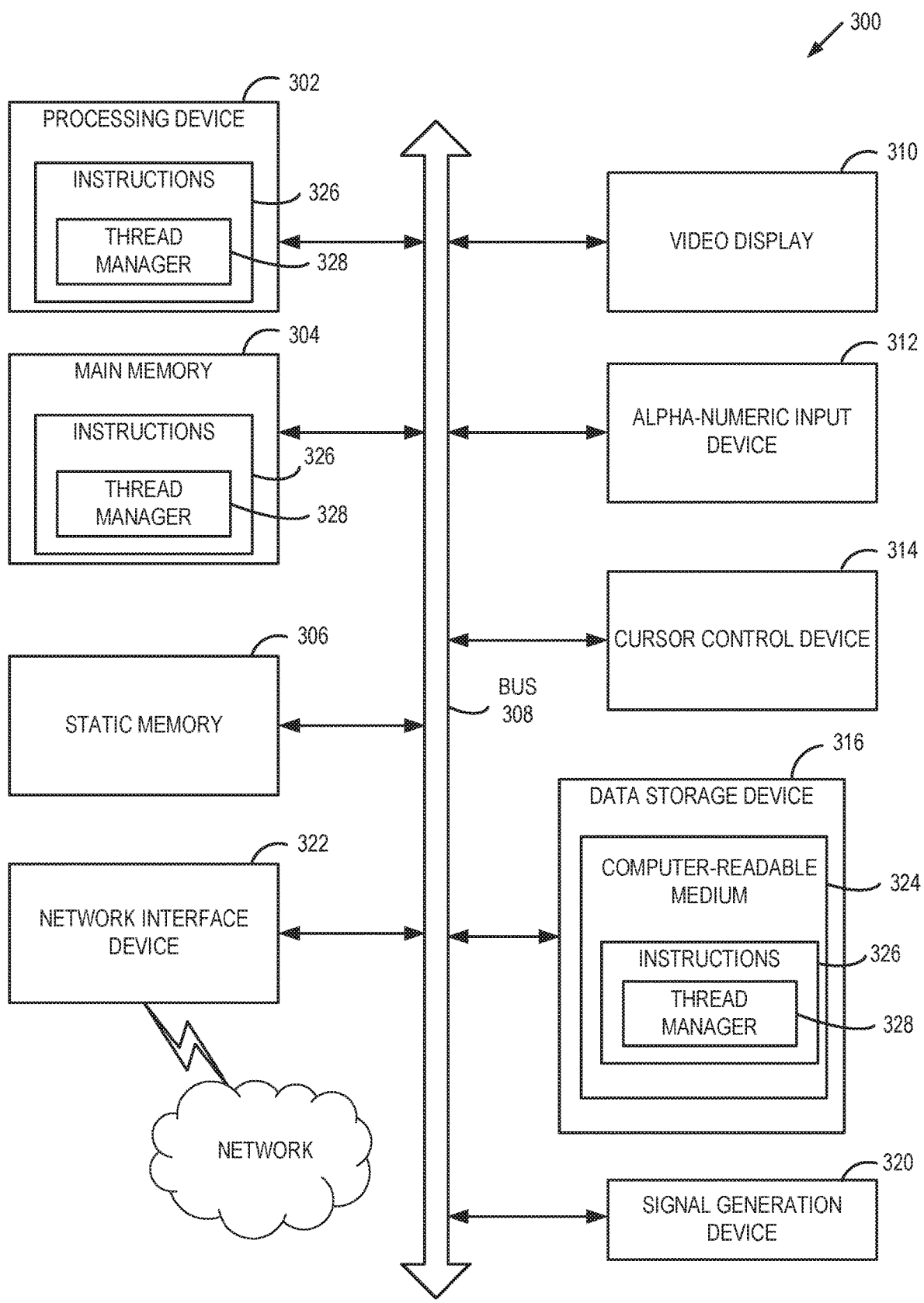
FIG. 3 depicts a block diagram of an illustrative computer system operating in accordance with embodiments of the disclosure.

FIG. 3 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 306.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the methods of FIGS. 2 and 3, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "determining", "receiving", "copying", "mapping", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Other computer system designs and configurations may also be suitable to implement the systems and methods described herein. The following examples illustrate various implementations in accordance with one or more aspects of the present disclosure.

Example 1 is a method comprising analyzing a plurality of build configuration files describing parameters for building a plurality of source code files; determining whether a single function is declared in the plurality of build configuration files for a given symbolic name; and generating a macro substitution command to substitute an identifier of the single function for the given symbolic name.

Example 2 is a method of example 1, wherein generating the macro substitution command comprises inserting the macro substitution command into a compiler execution command.

Example 3 is a method of example 1, wherein generating the macro substitution command comprises inserting the macro substitution command into a build configuration file of the plurality of build configuration files.

Example 4 is a method of example 1, further comprising: identifying, within a source code file of the plurality of source code files, the given symbolic name; substituting the given symbolic name with the identifier of the single function using the generated macro substitution command, to generate updated source code for compilation; and compiling the updated source code file into a plurality of executable instructions, wherein the executable instructions comprise instructions to perform the single function specified by the identifier.

Example 5 is a method of example 1, further comprising: identifying, within a source code file of the plurality of source code files, the given symbolic name; in response to determining that two or more functions have been declared in the plurality of build configuration files for the given symbolic name, substituting the given symbolic name with an indirect function call, to generate updated source code for compilation; and compiling the updated source code file into a plurality of executable instructions, wherein the executable instructions comprise instructions to perform the indirect function call.

Example 6 is a method of example 5, wherein the indirect function call is defined within the source code file with tags marking a code block as preprocessing code.

Example 7 is a method of example 1, wherein the single function is a function call for a driver of a physical device.

Example 8 is a system comprising: a memory; and a processor operatively coupled to the memory, to execute a build system to: analyze a plurality of build configuration files describing parameters for building a plurality of source code files; determine whether a single function is declared in the plurality of build configuration files for a given symbolic name; and in response to determining that two or more functions have been declared in the plurality of build configuration files for the given symbolic name, substitute the given symbolic name with an indirect function call, within a source code file of the plurality of source code files.

Example 9 is a system of example 8, wherein the processor is further to: compile the updated source code file into a plurality of executable instructions, wherein the executable instructions comprise instructions to perform the indirect function call.

Example 10 is a system of example 8, wherein the indirect function call is defined within the source code file as code marked for preprocessor evaluation.

Example 11 is a system of example 8, wherein the processor is further to: in response to determining that the single function has been declared in the plurality of build configuration files for the given symbolic name, generate a macro substitution command to substitute an identifier of the single function for the given symbolic name.

Example 12 is a system of example 11, wherein to generate the macro substitution command comprises inserting the macro substitution command into a compiler execution command.

Example 13 is a system of example 11, wherein to generate the macro substitution command comprises inserting the macro substitution command into a build configuration file of the plurality of build configuration files.

Example 14 is a system of example 11, wherein the processor is further to: identify, within a source code file of the plurality of source code files, the given symbolic name; substitute the given symbolic name with the identifier of the single function using the generated macro substitution command, to generate updated source code for compilation; and compile the updated source code file into a plurality of executable instructions, wherein the executable instructions comprise instructions to perform the single function specified by the identifier.

Example 15 is a non-transitory computer readable storage medium, having instructions stored therein, which when executed by a processing device of a computer system, cause the processing device to: analyze a plurality of build configuration files describing parameters for building a plurality of source code files; determine whether a single function is declared in the plurality of build configuration files for a given symbolic name; and generate a macro substitution command to substitute an identifier of the single function for the given symbolic name.

Example 16 is a non-transitory computer readable storage medium of example 15, wherein to generate the macro substitution command comprises inserting the macro substitution command into a compiler execution command.

Example 17 is a non-transitory computer readable storage medium of example 15, wherein to generate the macro substitution command comprises inserting the macro substitution command into a build configuration file of the plurality of build configuration files.

Example 18 is a non-transitory computer readable storage medium of example 15, wherein the processing device is further to: identify, within a source code file of the plurality of source code files, the given symbolic name; substitute the given symbolic name with the identifier of the single function using the generated macro substitution command, to generate updated source code for compilation; and compile the updated source code file into a plurality of executable instructions, wherein the executable instructions comprise instructions to perform the single function specified by the identifier.

Example 19 is a non-transitory computer readable storage medium of example 15, wherein the processing device is further to: identify, within a source code file of the plurality of source code files, the given symbolic name; in response to determining that two or more functions have been declared in the plurality of build configuration files for the given symbolic name, substitute the given symbolic name with an indirect function call, to generate updated source code for compilation; and compile the updated source code file into a plurality of executable instructions, wherein the executable instructions comprise instructions to perform the indirect function call.

Example 20 is a non-transitory computer readable storage medium of example 19, wherein the indirect function call is defined within the source code file as code marked for preprocessor evaluation.

What is claimed is:
1. A method comprising:
analyzing a plurality of build configuration files describing parameters for building a plurality of source code files;
determining whether a function is declared in a single instance in the plurality of build configuration files for a given symbolic name; and in response to determining the function is declared in a single instance, inserting a macro substitution command into a build configuration file of the plurality of build configuration files, wherein the macro substitution command substitutes an identifier of the function for the given symbolic name.

2. The method of claim 1, wherein inserting the macro substitution command comprises inserting the macro substitution command into a compiler execution command.

3. The method of claim 1, wherein inserting the macro substitution command into the build configuration file of the plurality of build configuration files comprises generating the macro substitution command.

4. The method of claim 1, further comprising:
identifying, within a source code file of the plurality of source code files, the given symbolic name;
substituting the given symbolic name with the identifier of the function using the macro substitution command, to generate updated source code for compilation; and
compiling the updated source code into a plurality of executable instructions, wherein the executable instructions comprise instructions to perform the function specified by the identifier.

5. The method of claim 1, further comprising:
identifying, within a source code file of the plurality of source code files, the given symbolic name;
in response to determining that two or more functions have been declared in the plurality of build configuration files for the given symbolic name, substituting the given symbolic name with an indirect function call, to generate updated source code for compilation; and
compiling the updated source code into a plurality of executable instructions, wherein the executable instructions comprise instructions to perform the indirect function call.

6. The method of claim 5, wherein the indirect function call is defined within the source code file as with tags marking a code block as code to be evaluated during preprocessing.

7. The method of claim 1, wherein the function is a function call for a driver of a physical device.

8. A system comprising:
a memory; and
a processor operatively coupled to the memory, to execute a build system to:
analyze a plurality of build configuration files describing parameters for building a plurality of source code files;
determine whether a function is declared in a single instance in the plurality of build configuration files for a given symbolic name; and
in response to determining that the function is declared in a single instance inserting a macro substitution command into a build configuration file of the plurality of build configuration files, wherein the macro substitution command substitutes an identifier of the function for the given symbolic name.

9. The system of claim 8, wherein to insert the macro substitution command into the build configuration file of the plurality of build configuration files, the processor is to:
generate the macro substitution command.

10. The system of claim 8, wherein to insert the macro substitution command, the processor is to insert the macro substitution command into a compiler execution command.

11. The system of claim 8, wherein the processor is further to:
identify, within a source code file of the plurality of source code files, the given symbolic name;
substitute the given symbolic name with the identifier of the function using the macro substitution command, to generate updated source code for compilation; and
compile the updated source code into a plurality of executable instructions, wherein the executable instructions comprise instructions to perform the function specified by the identifier.

12. A non-transitory computer readable storage medium, having instructions stored therein, which when executed by a processing device of a computer system, cause the processing device to:
analyze a plurality of build configuration files describing parameters for building a plurality of source code files;
determine whether a function is declared in a single instance in the plurality of build configuration files for a given symbolic name; and
in response to determining the function is declared in a single instance, insert a macro substitution command into a build configuration file of the plurality of build configuration files, wherein the macro substitution command substitutes an identifier of the function for the given symbolic name.

13. The non-transitory computer readable storage medium of claim 12, wherein to insert the macro substitution command comprises inserting the macro substitution command into a compiler execution command.

14. The non-transitory computer readable storage medium of claim 12, wherein to insert the macro substitution command into the build configuration file of the plurality of build configuration files comprises generating the macro substitution command.

15. The non-transitory computer readable storage medium of claim 12, wherein the processing device is further to:
identify, within a source code file of the plurality of source code files, the given symbolic name;
substitute the given symbolic name with the identifier of the function using the macro substitution command, to generate updated source code for compilation; and
compile the updated source code into a plurality of executable instructions, wherein the executable instructions comprise instructions to perform the function specified by the identifier.

16. The non-transitory computer readable storage medium of claim 12, wherein the processing device is further to:
identify, within a source code file of the plurality of source code files, the given symbolic name;
in response to determining that two or more functions have been declared in the plurality of build configuration files for the given symbolic name, substitute the given symbolic name with an indirect function call, to generate updated source code for compilation; and
compile the updated source code into a plurality of executable instructions, wherein the executable instructions comprise instructions to perform the indirect function call.

17. The non-transitory computer readable storage medium of claim 16, wherein the indirect function call is defined within the source code file as code marked for preprocessor evaluation.

18. The system of claim 8, wherein the processor is further to:
identify, within a source code file of the plurality of source code files, the given symbolic name;
in response to determining that two or more functions have been declared in the plurality of build configuration files for the given symbolic name, substituting the given symbolic name with an indirect function call, to generate updated source code for compilation; and compiling the updated source code into a plurality of executable instructions, wherein the executable instructions comprise instructions to perform the indirect function call.

19. The system of claim 18, wherein the indirect function call is defined within the source code file as with tags marking a code block as code to be evaluated during preprocessing.

20. The non-transitory computer readable storage medium of claim 12, wherein the function is a function call for a driver of a physical device.

* * * * *